(12) United States Patent
Moro

(10) Patent No.: US 6,877,696 B2
(45) Date of Patent: Apr. 12, 2005

(54) EVACUATION SLIDE WITH LEADING EDGE SPOILER

(75) Inventor: Ramon J. Moro, Gilbert, AZ (US)

(73) Assignee: Goodrich Corporation, Charlotte, NC (US)

( * ) Notice: Subject to any disclaimer, the term of this patent is extended or adjusted under 35 U.S.C. 154(b) by 106 days.

(21) Appl. No.: 10/324,713

(22) Filed: Dec. 19, 2002

(65) Prior Publication Data

US 2004/0118979 A1 Jun. 24, 2004

(51) Int. Cl.[7] .............................................. B64D 25/14
(52) U.S. Cl. .................. 244/137.2; 244/905; 193/25 B; 182/48
(58) Field of Search ............................... 244/137.2, 905, 244/213, 130; 182/48; 193/25 R

(56) References Cited

U.S. PATENT DOCUMENTS

| | | | | |
|---|---|---|---|---|
| 2,399,494 A | * | 4/1946 | Manson | ........................ 441/37 |
| 2,453,403 A | * | 11/1948 | Bogardus | ..................... 244/200 |
| 3,108,766 A | * | 10/1963 | Beckman | ..................... 244/200 |
| 3,370,684 A | | 2/1968 | Holcombe | |
| 3,554,344 A | * | 1/1971 | Summer et al. | ........... 193/25 B |
| 3,794,275 A | * | 2/1974 | Satter | .......................... 244/200 |
| 5,360,186 A | * | 11/1994 | Danielson et al. | ........ 244/137.2 |
| 2002/0117354 A1 | * | 8/2002 | Baker et al. | ................... 182/48 |

FOREIGN PATENT DOCUMENTS

EP          1090837      10/2000

* cited by examiner

*Primary Examiner*—Galen Barefoot
(74) *Attorney, Agent, or Firm*—Jerry Holden; John Titus

(57) ABSTRACT

An inflatable evacuation slide is presented that includes an aerodynamic spoiler to kill the lift caused by air flowing laterally over the slide. The slide preferably comprises a fabric sliding surface stretched between two longitudinal main side members. The spoiler comprises a fabric panel, supported by a plurality of fabric gussets, that extends outward from each of the main side members. When the main side member of the slide is exposed to a lateral wind load, the spoiler creates a flow separation that kills the lift generated by the airflow. By killing the lift induced by the airflow over the top of the inflatable evacuation slide, zero or negative lift is generated by the airflow over the inflatable evacuation slide, which causes the slide to deploy downward firmly contacting the ground even in high wind conditions.

12 Claims, 3 Drawing Sheets

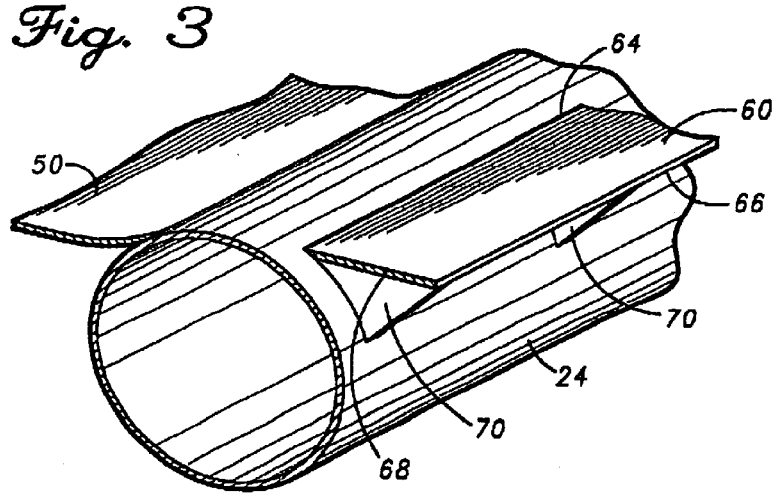
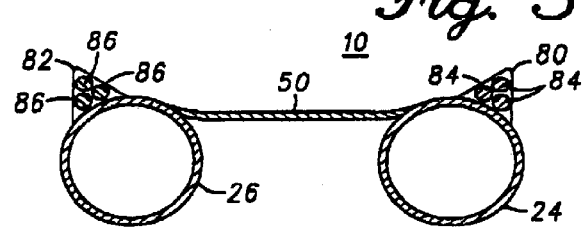
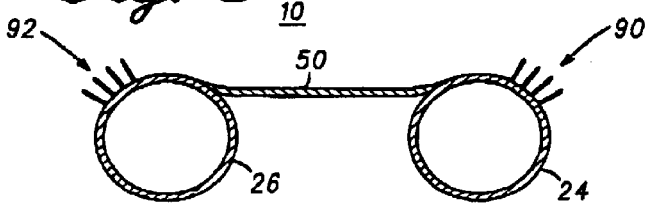
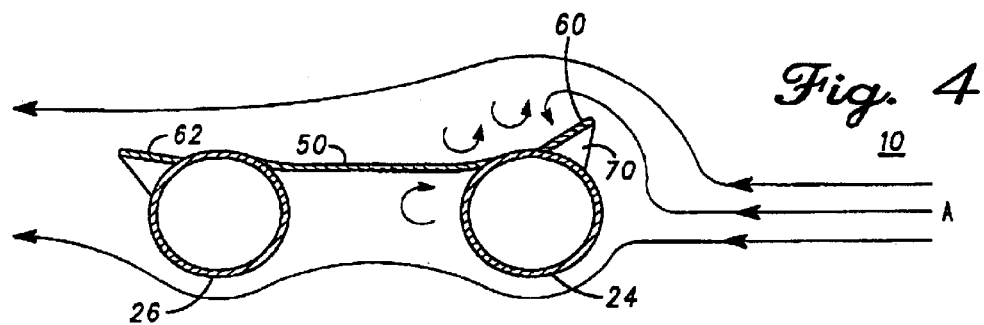

EVACUATION SLIDE WITH LEADING EDGE SPOILER

BACKGROUND OF THE INVENTION

This invention relates to emergency evacuation equipment and, in particular, to an inflatable emergency evacuation slide.

The requirement for reliably evacuating airline passengers in the event of an emergency is well-known. Emergencies at take-off and landing often demand swift removal of the passengers from the aircraft because of the potential of injuries from fire, explosion, or sinking in water. A conventional method of quickly evacuating a large number of passengers from an aircraft is to provide multiple emergency exits, each of which is equipped with an inflatable evacuation slide.

A common problem associated with inflatable evacuation slides, however, is that when such slides are deployed in high lateral wind conditions, the wind may cause the slide to "kite" such that the foot end of the slide does not touch the ground, rendering the slide unusable. If the slide lifts off the ground above the airplane's door sill height after full extension, the slide may even block the aircraft exit and prevent safe evacuation of passengers and crew. Accordingly, what is needed is an inflatable evacuation slide that does not develop positive lift and therefore will deploy properly downward toward the ground even under high wind conditions.

SUMMARY OF THE INVENTION

The present invention comprises an inflatable evacuation slide having an aerodynamic spoiler to kill the lift caused by air flowing laterally over the slide. In one embodiment, the slide comprises a fabric sliding surface stretched between two longitudinal main side members. The main side members are supported by a plurality of transverse tubes and transverse trusses such that the main side members maintain the sliding surface in a taut condition suitable for use as a slide. The spoiler comprises a fabric panel, supported by a plurality of fabric gussets, that extends outward from each of the main side members. The fabric panel extends outward from the main side member such that when the main side member is exposed to a lateral wind load, the spoiler creates a flow separation that kills the lift generated by the airflow over the main side member. By killing the lift induced by the airflow over the top of the inflatable evacuation slide, zero or negative lift is generated by the airflow over the inflatable evacuation slide, which causes the slide to deploy downward firmly contacting the ground even in high wind conditions.

BRIEF DESCRIPTION OF THE DRAWING

The present invention will be better understood from a reading of the following detailed description, taken in conjunction with the accompanying drawing figures in which like references designate like elements and, in which:

FIG. 3 is a partial perspective view of a main side rail member of the evacuation slide of FIG. 2;

FIG. 4 is a cross-section of the evacuation slide of FIG. 2 as indicated by arrows 4—4;

FIG. 5 is a cross-section view an alternative embodiment of an evacuation slide incorporating features of the present invention; and, FIG. 6 is an additional alternative embodiment of an evacuation slide incorporating features of the present invention.

DETAILED DESCRIPTION

Figure 1:
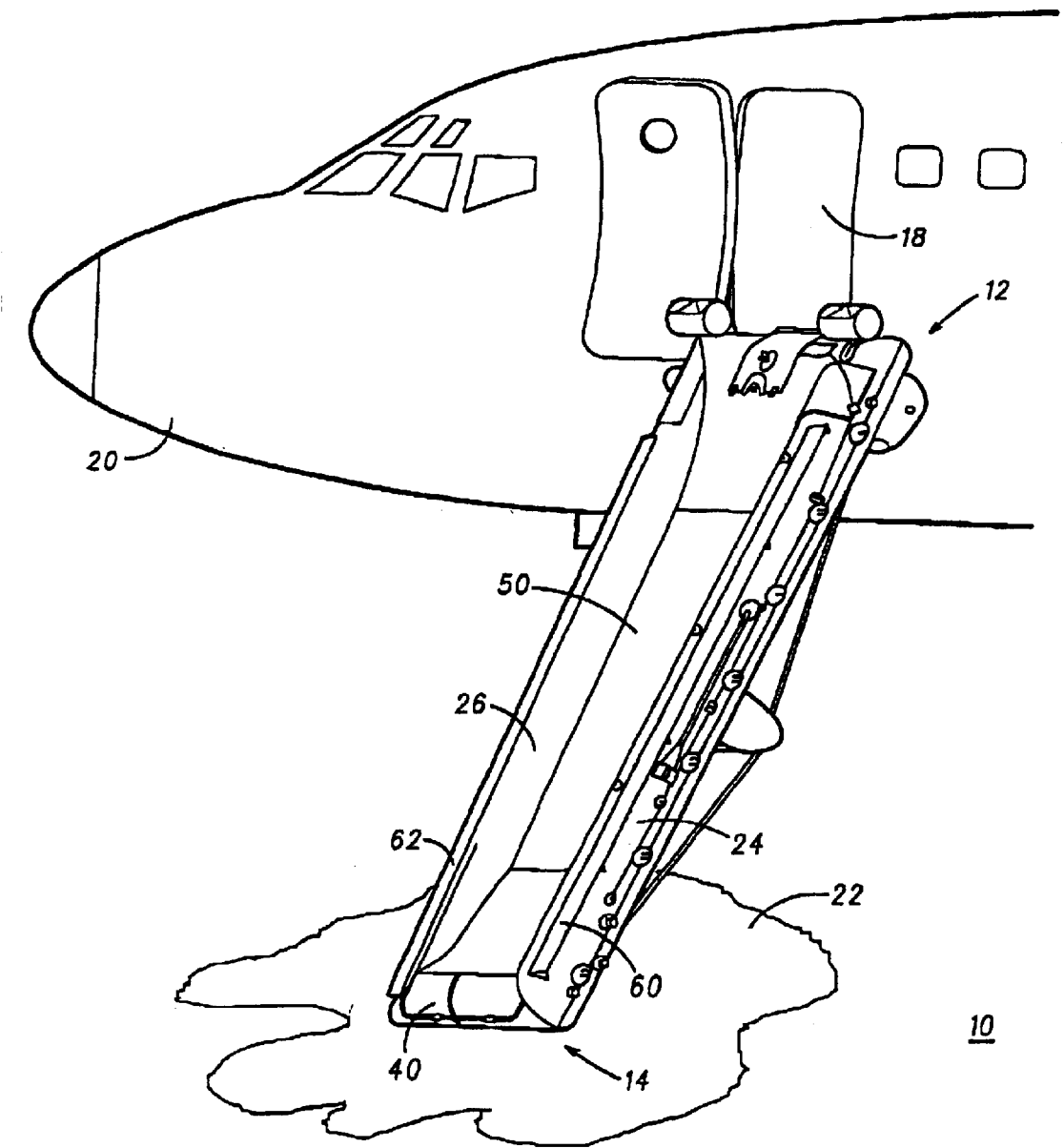
FIG. 1 is a perspective view of an evacuation slide incorporating features of the present invention.

The drawing figures are intended to illustrate the general manner of construction and are not necessarily to scale. In the detailed description and in the drawing figures, specific illustrative examples are shown and herein described in detail. It should be understood, however, that the drawing figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an inflatable evacuation slide 10 incorporating features of the present invention. Inflatable evacuation slide 10 generally comprises a head end 12 and a foot end 14. Head end 12 is configured to couple inflatable evacuation slide 10 to an exit doorway 18 of an aircraft 20 while foot end 14 is in contact with the ground 22 such that the inflatable evacuation slide 10 provides a sloping surface to permit the rapid egress of passengers from aircraft 20.

The entire inflatable evacuation slide 10 is preferably fabricated from an air impervious material such as a lightweight fabric that has been coated with an elastomer such as rubber or urethane. The various parts of the inflatable evacuation slide 10 may be joined together with a suitable adhesive whereby the structure will form a unitary composite structure capable of maintaining its shape during operation. The entire structure of the inflatable evacuation slide 10 is preferably formed such that all of the chambers comprising the structure are interconnected pneumatically such that a single pressurized gas source, such as compressed carbon dioxide, nitrogen, argon, a pyrotechnic gas generator, or combination thereof, may be utilized for its deployment.

Figure 2:
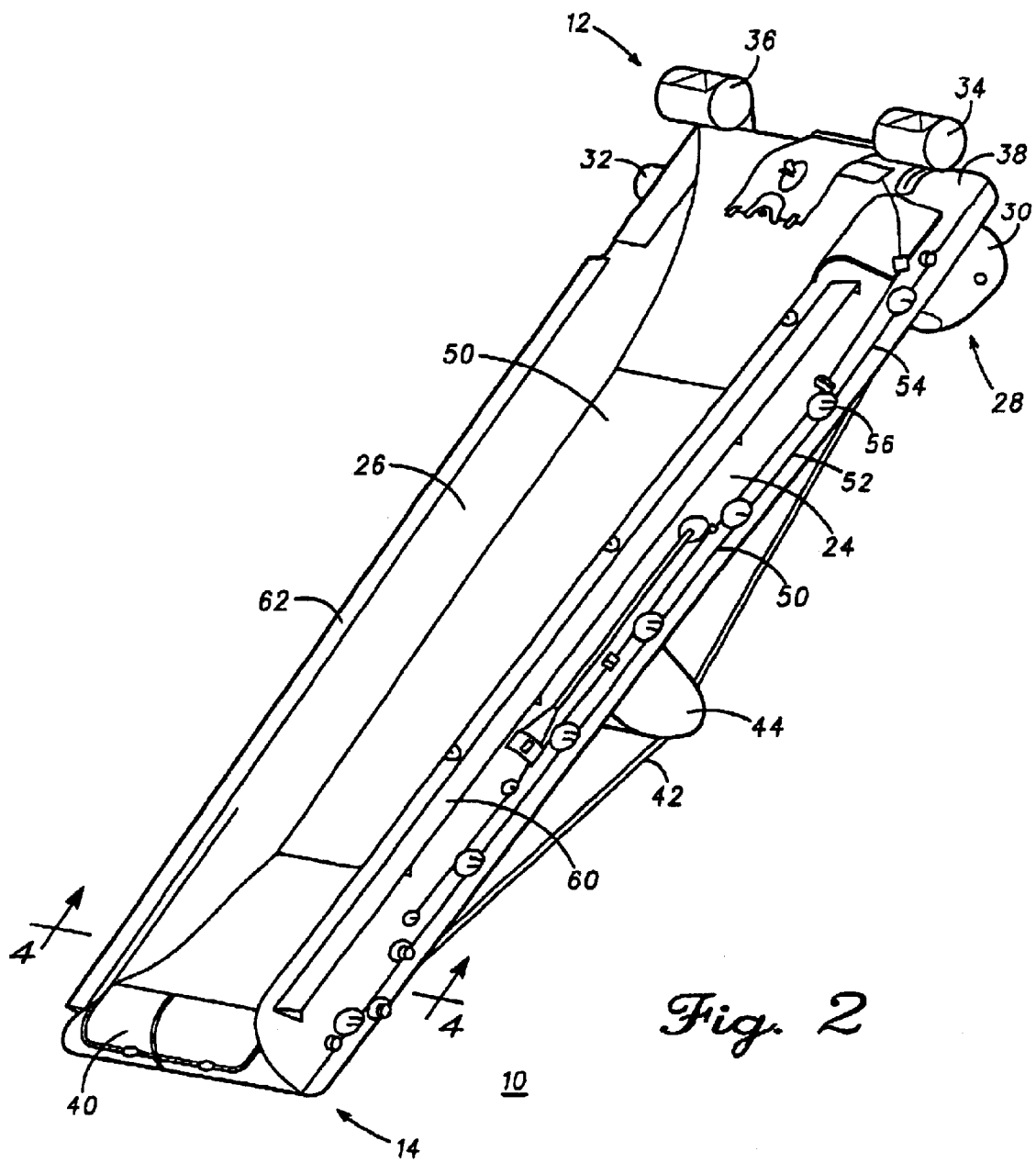
FIG. 2 is a close-up of a perspective view of the evacuation slide of FIG. 1.

As shown more fully in FIG. 2, the main body of inflatable evacuation slide 10 comprises main side tubes 24 and 26 which extend from head end truss assembly 28 to the ground 22. Head end truss assembly comprises pillow tubes 30 and 32, pusher tubes 34 and 36, and head end transverse tube 38. Head end truss assembly 28 is adapted to hold head end 12 of emergency evacuation slide 10 against the fuselage of aircraft 20 in an orientation to permit inflatable evacuation slide 10 to unfurl in a controlled manner as it extends toward the ground.

The spaced apart configuration of main side tubes 24 and 26 is maintained by head end transverse tube 38 and toe end transverse tube 40, such that main side tubes 24 and 26 support a fabric slide surface 50 in a taut condition suitable for use as an escape slide. The bending strength of evacuation slide 10 is enhanced by means by one or more tension straps 42 stretched from foot end 14 to head end 12 of escape slide 10 over medial transverse truss 44. Inflatable evacuation slide 10 may optionally include one or more peripheral handles 52 comprising a length of cord 54 passed through a series of eyelets 56 so as to create a handle for assisting passengers for holding onto inflatable evacuation slide 10 when it is used as a life raft. As described, inflatable evacuation slide 10 provides a lightweight structure that consumes a minimal amount of inflation gas while providing the necessary structural rigidity to permit passengers to safely evacuate an aircraft under emergency conditions.

As noted hereinbefore, prior art evacuation slides are subject to "kiting" under high wind conditions rendering such slides unusable or worse, causing such slides to block the emergency exits altogether. Accordingly, the present invention includes spoilers 60, 62 attached to the outboard side of each of main side tubes 24 and 26. Spoiler 62 is identical in function to spoiler 60. Accordingly, the details of spoiler 62 will not be discussed herein.

As shown more clearly in FIG. 3, spoiler 60 comprises a flexible fabric panel having an inner edge 64 and an outer edge 66 as well as a short edge 68. With reference to FIGS. 3 and 4 spoiler 60 is attached along its inner edge 64 to main side tube 24 and supported by a plurality of flexible fabric gussets 70 such that outer edge 66 of spoiler 60 extends outward and away from main side tube 24. The principal of operation of a spoiler is well-known in the design of aircraft wings and the like. The action of a spoiler in the deployed position on a wing is to "spoil" or separate the flow of air downstream of the spoiler. The lift of the wing is therefore reduced and the drag increased.

As shown in FIG. 4, spoiler 60 supported by gussets 70 spoils the flow of air over evacuation slide 10 indicated by arrows A such that the lift that would otherwise have been created by the airflow over main side tube 24, slide surface 50 and main side tube 26 is spoiled. Accordingly, evacuation slide 10 produces zero lift, or preferably negative lift, when subjected to the flow of air over inflatable evacuation slide 10.

As shown in FIG. 5, in lieu of a flexible panel spoiler such as spoiler 60, the spoilers may take the form of inflatable structures 80 and 82 comprising a fabric panel having a generally polygonal cross section supported by one or more inflatable tubular members 84 and 86. Similarly, as shown in FIG. 6, the spoilers may take the form of a plurality of ribs 90 and 92 which disrupt the airflow flowing over main side tubes 24 and 26 so as to spoil the flow over inflatable evacuation slide 10. The exact configuration of the spoiler may take many other shapes, so long as the effect is to cause flow separation in high transverse wind conditions.

Although certain illustrative and embodiments and methods have been disclosed herein, it will be apparent to the foregoing disclosure to those skilled in the art that variations and modifications of such embodiments and methods may be made without departing from the spirit and scope of the invention. For example, in lieu of a single continuous spoiler, a series of short spoilers or indeed, any other means of inducing flow separation across the top surface of main side tubes 24 or 26 is considered within the scope of the present invention. Accordingly, it is intended that the invention shall be limited only to the extent required by the appended claims and rules and principals of applicable law.

What is claimed is:

1. An inflatable evacuation slide adapted to extend in a deployed condition from an elevated supporting surface to a lower supporting surface, said inflatable evacuation slide comprising:
    a plurality of inflatable tubular members, which in a deployed condition, present a slide surface extending in a longitudinal direction from a head end proximal said elevated supporting surface to a foot end supported by said lower supporting surface, said longitudinal tubular members including at least a first main side member, said first main side member having an upper surface, an inboard side and an outboard side; and
    a spoiler mounted on said outboard side of said first main side member for reducing a coefficient of lift of said inflatable evacuation slide assembly, said spoiler comprising an elongate member attached to said first main side member substantially parallel to a longitudinal axis of said first main side member, said elongate member comprising a flexible panel having a fixed edge and a non-self-supporting, floppy free edge, said fixed edge being attached to said first main side member.

2. The inflatable evacuation slide of claim 1, wherein:
    said spoiler further comprises a plurality of flexible supports for limiting movement of said free edge of said flexible panel in one direction.

3. The inflatable evacuation slide of claim 2, wherein:
    said plurality of flexible supports comprises a plurality of flexible gussets for supporting said flexible panel.

4. An inflatable evacuation slide adapted to extend in a deployed condition from an elevated supporting surface to a lower supporting surface, said inflatable evacuation slide comprising:
    a plurality of inflatable tubular members, which in a deployed condition, present a slide surface extending in a longitudinal direction from a head end proximal said elevated supporting surface to a foot end supported by said lower supporting surface, said longitudinal tubular members including at least a first main side member, said first main side member having an upper surface, an inboard side and an outboard side; and
    a spoiler mounted on said outboard side of said first main side member for reducing a coefficient of lift of said inflatable evacuation slide assembly, said spoiler comprising an elongate member attached to said first main side member substantially parallel to a longitudinal axis of said first main side member,
    wherein said elongate member comprises an inflatable member having a polygonal cross section and a long edge, wherein said long edge is attached to said first main side member.

5. An inflatable evacuation slide adapted to extend in a deployed condition from an elevated supporting surface to a lower supporting surface, said inflatable evacuation slide comprising:
    a plurality of inflatable tubular members, which in a deployed condition, present a slide surface extending in a longitudinal direction from a head end proximal said elevated supporting surface to a foot end supported by said lower supporting surface, said longitudinal tubular members including at least a first main side member having an upper surface, an inboard side and an outboard side; and
    a spoiler mounted on said outboard side for reducing a coefficient of said inflatable evacuation slide assembly, wherein said first main side member in cross section defines an upper inboard quadrant, an upper outboard quadrant, a lower inboard quadrant and a lower outboard quadrant and wherein said spoiler comprises a plurality of ribs attached to said upper outboard quadrant of said first main side member substantially parallel to a longitudinal axis of said first main side member.

6. An inflatable evacuation slide assembly adapted to extend from an elevated supporting surface to a lower supporting surface, said inflatable evacuation slide assembly comprising:
    a flexible panel defining a slide surface having an upper surface, a first lateral edge and a second lateral edge and extending from a head end of the inflatable evacuation slide assembly to a foot end of the inflatable evacuation slide assembly;
    first and second main side members attached to said first and second lateral edges of said flexible panel, said first and second main side members each comprising an inflatable tubular member extending from proximal the head end to proximal the foot end of the o the inflatable evacuation slide assembly, said first and second main side members being disposed in a spaced-apart configuration for supporting said flexible panel; and a spoiler mounted on said first main side member outboard of said flexible panel for causing a reduction in a coefficient of lift of said inflatable evacuation slide assembly, wherein said spoiler comprises an elongate member attached to said first main side member substantially parallel to a longitudinal axis of said first main side member, said elongate member comprising a flexible panel having a fixed edge and a non-self-supporting free edge, said fixed edge being attached to said first main side member.

7. The inflatable evacuation slide of claim 6, wherein:

said spoiler further comprises a plurality of flexible supports for limiting movement of said free edge of said flexible panel in one direction.

8. The inflatable evacuation slide of claim 7, wherein:

said plurality of flexible supports comprises a plurality of flexible gussets for supporting said flexible panel.

9. An inflatable evacuation slide assembly adapted to extend from an elevated supporting surface to a lower supporting surface, said inflatable evacuation slide assembly comprising:

a flexible panel defining a slide surface having an upper surface, a first lateral edge and a second lateral edge and extending from a head end of the inflatable evacuation slide assembly to a foot end of the inflatable evacuation slide assembly;

first and second main side members attached to said first and second lateral edges of said flexible panel, said first and second main side members each comprising an inflatable tubular member extending from proximal the head end to proximal the foot end of the of the inflatable evacuation slide assembly, said first and second main side members being disposed in a spaced-apart configuration for supporting said flexible panel; and a spoiler mounted on said first main side member outboard of said flexible panel for causing a reduction in a coefficient of lift of said inflatable evacuation slide assembly, wherein said elongate member comprises an inflatable member having a polygonal cross section and a long edge, wherein said long edge is attached to said first main side member.

10. An inflatable evacuation slide assembly adapted to extend from an elevated supporting surface to a lower supporting surface, said inflatable evacuation slide assembly comprising:

a flexible panel defining a slide surface having an upper surface, a first lateral edge and a second lateral edge and extending from a head end of the inflatable evacuation slide assembly to a foot end of the inflatable evacuation slide assembly;

first and second main side members attached to said first and second lateral edges of said flexible panel, said first and second main side members each comprising an inflatable tubular member extending from proximal the head end to proximal the foot end of the of the inflatable evacuation slide assembly, said first and second main side members being disposed in a spaced-apart configuration for supporting said flexible panel; and a spoiler mounted on said first main side member outboard of said flexible panel for causing a reduction in a coefficient of lift of said inflatable evacuation slide assembly, wherein said first main side member in cross section defines an upper inboard quadrant, an upper outboard quadrant, a lower inboard quadrant and a lower outboard quadrant and wherein said spoiler comprises a plurality of ribs attached to said upper outboard quadrant of said first main side member substantially parallel to a longitudinal axis of said first main side member.

11. An inflatable evacuation slide adapted to extend in a deployed condition from an elevated supporting surface to a lower supporting surface, said inflatable evacuation slide comprising:

a plurality of inflatable tubular members, which in a deployed condition, present a slide surface extending in a longitudinal direction from a head end proximal said elevated supporting surface to a foot end supported by said lower supporting surface, said longitudinal tubular members including at least a first main side member, said first main side member having an upper surface, an inboard side and an outboard side;

a handrail member attached to said first main side member extending along a longitudinal axis of said main side member, said handrail member being adapted for grasping by a passenger sliding on said slide surface; and a spoiler mounted on said outboard side of said first main side member for reducing a coefficient of lift of said inflatable evacuation slide assembly, said spoiler comprising an elongate member attached to said first main side member substantially parallel to a longitudinal axis of said first main side member.

12. The evacuation slide of claim 11, wherein:

said handrail member is mounted to said first main side member outboard of said spoiler relative to slide surface.

* * * * *